(12) United States Patent
Murata et al.

(10) Patent No.: US 12,311,480 B2
(45) Date of Patent: May 27, 2025

(54) TOUCH-START WELDING METHOD BETWEEN COILS OF DIFFERENT HEIGHT AND DEVICE THEREOF

(71) Applicant: HONDA MOTOR CO., LTD., Tokyo (JP)

(72) Inventors: Kenichiro Murata, Tochigi (JP); Takeshi Yanagisawa, Tochigi (JP); Akifumi Sudo, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 844 days.

(21) Appl. No.: 17/530,729

(22) Filed: Nov. 19, 2021

(65) Prior Publication Data

US 2022/0072644 A1 Mar. 10, 2022

Related U.S. Application Data

(62) Division of application No. 16/084,034, filed as application No. PCT/JP2017/004255 on Feb. 6, 2017, now abandoned.

(30) Foreign Application Priority Data

Mar. 17, 2016 (JP) .................................. 2016-054250

(51) Int. Cl.
  *B23K 9/095* (2006.01)
  *B23K 9/12* (2006.01)
  (Continued)

(52) U.S. Cl.
  CPC ............ *B23K 9/0956* (2013.01); *B23K 9/126* (2013.01); *B23K 9/164* (2013.01); *B23K 9/167* (2013.01); *B23K 2101/36* (2018.08)

(58) Field of Classification Search
  CPC ...... B23K 9/0956; B23K 9/126; B23K 9/164; B23K 9/167; B23K 2101/36; B23K 9/0206; B23K 9/0026; B23K 9/0671; H01R 43/02
  See application file for complete search history.

(56) References Cited

U.S. PATENT DOCUMENTS 3,646,309 A 2/1972 Smith, Jr. et al.
4,491,718 A 1/1985 Cook
(Continued)

FOREIGN PATENT DOCUMENTS

JP 54-26253 2/1979
JP 2010-200462 9/2010
(Continued)

OTHER PUBLICATIONS

International Search Report, Date of mailing: Apr. 4, 2017, 4 pages.
Chinese Office Action dated Jan. 22, 2020, 7 pages.

*Primary Examiner* — John P. Dulka
(74) *Attorney, Agent, or Firm* — Rankin, Hill & Clark LLP

(57) ABSTRACT

A TIG welding device (10) includes a welding robot (11), robot control device (12), welding torch (13), welding control device (14), gas feeder (15), and a height detection device (16). The welding torch (13) is set at a reference position, and the height detection device (16) detects the respective heights of two tip parts (4*e*). The robot control device (12) drives the welding robot (11) such that a torch electrode (13*c*) of the welding torch (13) abuts on central part of the higher tip part (4*e*). When the torch electrode (13*c*) is moved toward the reference position while power is supplied to the torch electrode (13*c*), and inert gas flows in the periphery of the torch electrode (13*c*), arc (AC) is generated in a gap between the tip parts (4*e*) and the torch (Continued)

electrode (13c). The overall two tip parts (4e) are melted and welded by this arc (AC).

4 Claims, 7 Drawing Sheets

(51) Int. Cl.
*B23K 9/16* (2006.01)
*B23K 9/167* (2006.01)
*B23K 101/36* (2006.01)

(56) References Cited

U.S. PATENT DOCUMENTS

| | | | |
|---|---|---|---|
| 4,613,743 | A | 9/1986 | Nied |
| 5,923,555 | A | 7/1999 | Bailey |
| 6,744,012 | B2 | 6/2004 | Ueda |
| 6,915,556 | B2 * | 7/2005 | Lenoir ................ H02K 15/35 |
| | | | 29/598 |
| 8,851,896 | B2 | 10/2014 | Wallace |
| 2002/0041129 | A1 * | 4/2002 | Oohashi ................ H02K 15/30 |
| | | | 310/179 |
| 2004/0045945 | A1 | 3/2004 | Shimogama |
| 2005/0108870 | A1 * | 5/2005 | Harada ............... H02K 15/0414 |
| | | | 29/606 |
| 2008/0148551 | A1 * | 6/2008 | Hara ....................... H02K 15/35 |
| | | | 29/598 |
| 2011/0259863 | A1 * | 10/2011 | Utaka .................... B23K 9/0026 |
| | | | 219/137 R |
| 2015/0222155 | A1 * | 8/2015 | Nakayama ............. H02K 15/33 |
| | | | 29/596 |
| 2015/0246406 | A1 | 9/2015 | Takayama |
| 2016/0218603 | A1 * | 7/2016 | Schroth .................... H02K 3/50 |
| 2017/0090431 | A1 | 3/2017 | Komatsu |

FOREIGN PATENT DOCUMENTS

| | | |
|---|---|---|
| JP | 2012-257391 | 12/2012 |
| JP | 2014-87819 | 5/2014 |
| JP | 2014-94386 | 5/2014 |
| JP | 5540791 | 7/2014 |
| JP | 2014-172071 | 9/2014 |
| JP | 2015-128787 | 7/2015 |

* cited by examiner

12,311,480 B2

TOUCH-START WELDING METHOD BETWEEN COILS OF DIFFERENT HEIGHT AND DEVICE THEREOF

TECHNICAL FIELD

The present invention relates to a welding method and device for performing arc welding by use of an electrode.

BACKGROUND ART

In a stator composing a rotary electric machine such as an electric motor and a generator, ends of coil segments protrude from a plurality of slots formed in the circumferential direction of a stator core, and the respective ends of the adjacent coil segments are welded to each other. This welding is performed by TIG (Tungsten Inert Gas) welding.

A terminal member welding method disclosed in Patent Literature 1 has a first step of configuring a welded joint by combining first and second terminal members, a second step of inserting a tip of the electrode in a gap of the welded joint, a third step of starting energization between the electrode and the first and second terminal members under a state in which the tip of the electrode is inserted in the gap of the welded joint, a fourth step of melting the welding joint by pulling the tip of the electrode from the gap of the welded joint while continuing the energization to generate an arc between the electrode and the welded joint, and performing TIG welding of the first and second terminal members.

CITATION LIST

Patent Literature

Patent Literature 1: Japanese Patent Laid-Open No. 2014-087819

SUMMARY OF INVENTION

Technical Problem

In the terminal member welding method disclosed in Patent Literature 1, the tip of the electrode is inserted in the gap of the welded joint. However, in order to perform this insertion, highly accurate positioning is needed, and furthermore, abrasion of the electrode tip proceeds by insertion and pull-out.

In a case where the heights of the first and second terminal members are different, and distances from respective tip surfaces to the electrode tip are different, contact areas of the first and second terminal members and the electrode are uneven, and melting sometimes is not evenly performed by the welding method of Patent Literature 1. Therefore, a bead formed by welding also becomes an uneven shape, and welding cannot be sometimes performed.

The present invention has been made in view of such circumstances, and an object of the present invention is to provide a welding method and a device capable of reliably welding even in a case where distances from respective tip surfaces to be welded of a first workpiece and a second workpiece to a tip of an electrode are different.

Solution to Problem

A welding method of the present invention is a welding method for arc welding a first workpiece and a second workpiece by use of an energized electrode, the welding method including: a first step of detecting one of the first workpiece and the second workpiece, the one having a shorter distance from a tip surface to be welded to a tip of the electrode; a second step of abutting the tip of the electrode on the tip surface of the one detected in the first step; and a third step of generating an arc by separating the tip of the energized electrode from the tip surface of the one detected in the first step, after the second step, and arc welding the first workpiece and the second workpiece.

According to the present invention, after the tip of the electrode is made to abut on the tip surface of the one of the first workpiece and the second workpiece, the one having the shorter distance from the tip surface to be welded to the electrode, the tip of the energized electrode is separated from the tip surface of the one to generate the arc, and the first workpiece and the second workpiece are arc welded, so that a melting defect state in which only the other having a longer distance from the tip surface to the tip of the electrode is melted is not caused, and furthermore, the electrode is not welded to the first and second workpieces. Consequently, it is possible to reliably perform welding even in a case where the distances from the respective tip surfaces to be welded of the first workpiece and the second workpiece to the tip of the electrode are different.

In the third step, the tip of the energized electrode is displaced so as to be separated from the tip surface of the one detected in the first step, and approach the other to generate the arc.

According to this configuration, the first workpiece and the second workpiece are uniformly melted. Consequently, a weld bead can be uniformly and evenly formed on the first workpiece and the second workpiece.

In the second step, the tip of the electrode is preferably made to abut on a central part of the tip surface of the one detected in the first step.

According to this configuration, it is possible to more reliably perform welding even in a case where the distances from the respective tip surfaces to be welded of the first workpiece and the second workpiece to the tip of the electrode are different.

A welding device of the present invention is a welding device for arc welding a first workpiece and a second workpiece by use of an electrode, the welding device including: a detection unit configured to detect one of the first workpiece and the second workpiece, the one having a shorter distance from a tip surface to be welded to a tip of the electrode; a displacement unit configured to displace the electrode; a driving control unit configured to drive the displacement unit so as to abut the tip of the electrode on the tip surface of the one detected by the detection unit; an energization control unit configured to start energization to the electrode after the tip of the electrode is brought into contact with the tip surface of the one detected by the detection unit; and a welding control unit configured to generate an arc by driving the displacement unit such that the tip of the electrode is displaced so as to be separated from the tip surface of the one detected by the detection unit and approach the other, while maintaining energization, and to arc weld the first workpiece and the second workpiece.

Advantageous Effects of Invention

According to the present invention, welding can be reliably performed even in a case where distances from respective tip surfaces to be welded of a first workpiece and a second workpiece to a tip of an electrode are different.

DESCRIPTION OF EMBODIMENTS

Hereinafter, an embodiment of the present invention will be described with reference to the drawings.

First, an example of a structure of a rotary electric machine to be TIG-welded will be described.

Figure 1:
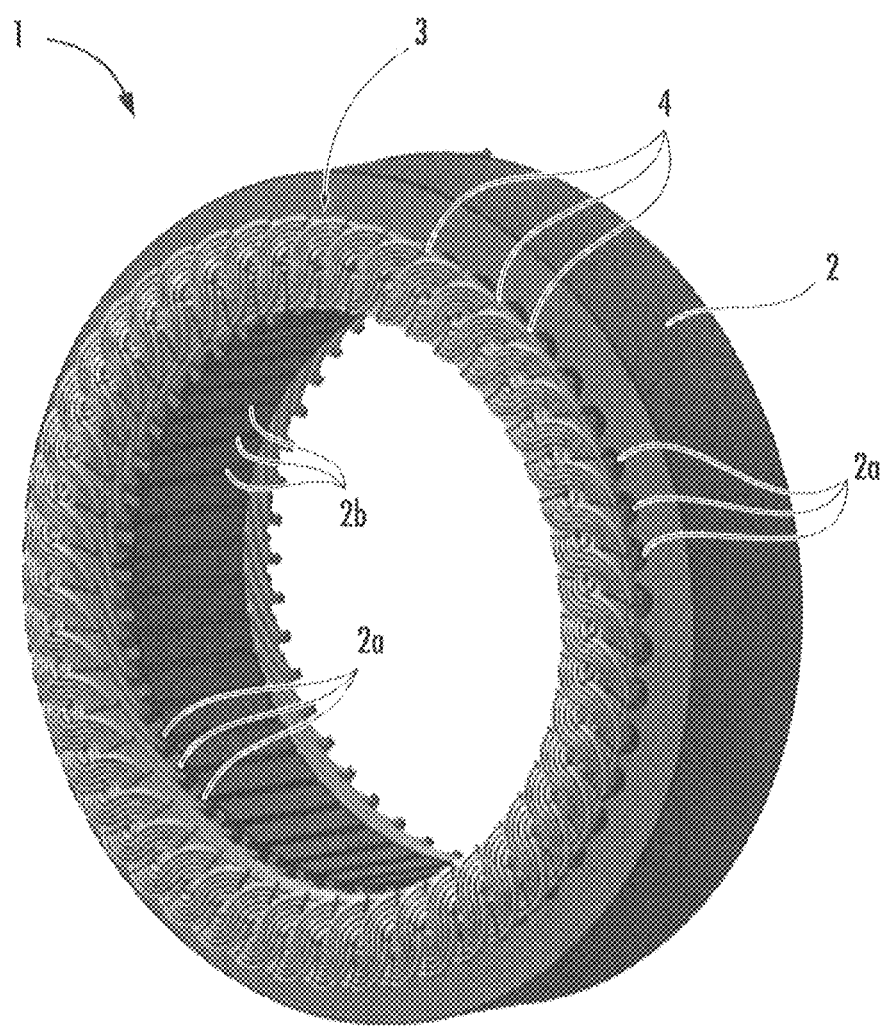
FIG. 1 is a perspective view illustrating a stator of a rotary electric machine welded by a TIG welding device of the present invention.

As illustrated in FIG. 1, a rotary electric machine such as an electric motor and a generator includes a stator 1 formed in a cylindrical shape, and a rotor (not illustrated) rotatably disposed inside the stator 1.

The stator 1 includes a stator core 2 and a coil 3. The stator core 2 has a cylindrical shape, and a plurality of slots 2a that penetrate in the rotation axis direction are provided at intervals in the circumferential direction. Each slot 2a is formed such that a sectional shape in the radial direction of the stator core 2 radially extends from the center of the stator core 2 toward the radial direction, and communicates with an inner circumferential surface of the stator core 2 through slits 2b formed in the stator core 2. The slits 2b may not be provided.

Figure 2:
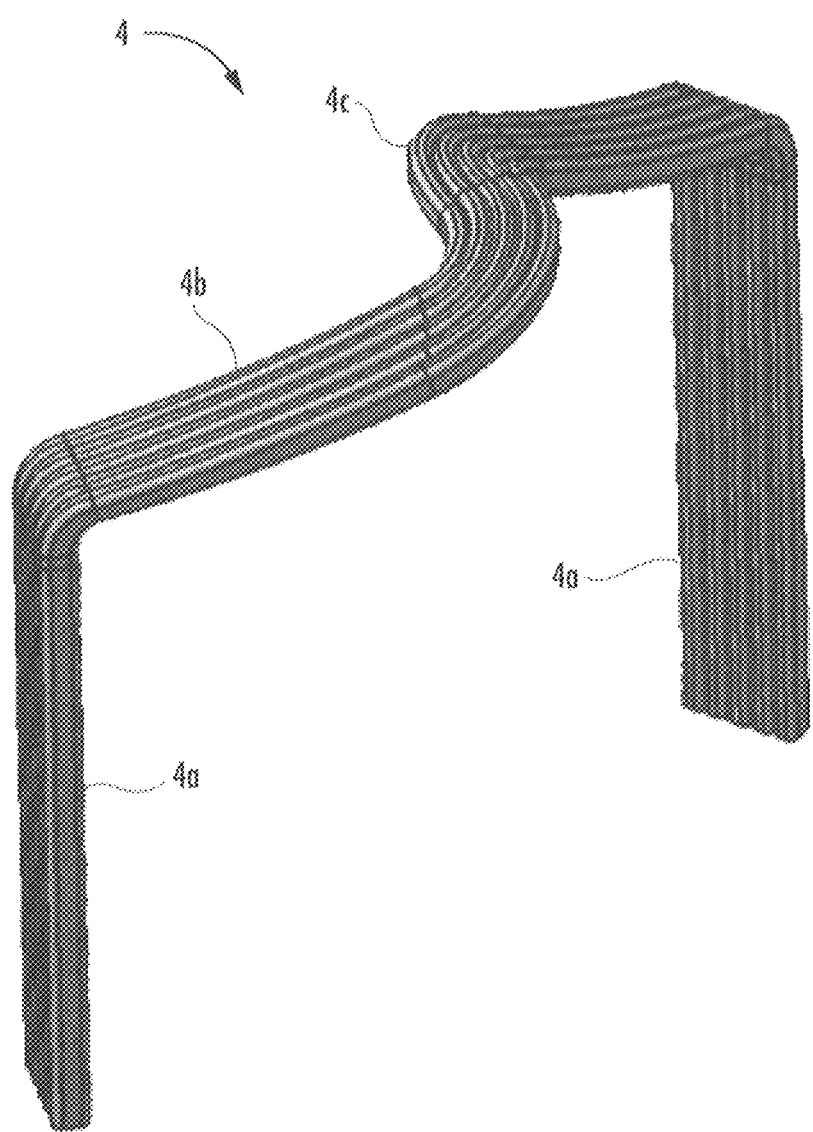
FIG. 2 is a perspective view illustrating a coil segment.

A coil segment 4 illustrated in FIG. 2 is inserted into each of the slots 2a from one side, and a protruding portion protruding from the other side of the slot 2a is twisted and bended in the circumferential direction to be welded, so that the coil 3 is configured.

Each coil segment 4 is formed in a U-shape by aligning a plurality of (four in the embodiment) conductors (conducting wires of rectangular wires) each having a rectangular cross section such that surfaces having wider widths face each other, and forming the conductors into a U-shaped single bundle, and includes a pair of leg parts 4a, 4a, and a head part 4b that connects respective ends (upper ends in the drawing) of the both leg parts 4a, 4a.

The coil segment 4 may be any bundle obtained by aligning a plurality of rectangular wires in the width direction, and may be a bundle obtained by aligning a plurality of rectangular wires such that surfaces having narrower widths face each other, for example.

An S-shaped part 4c that is curved in an S-shape in the alignment direction of the rectangular wires is formed in the center of the head part 4b. The head part 4b is inclined downward from the center (center of the S-shaped part 4c) toward the both leg parts 4a, 4a. The leg part 4a of the coil segment 4 is inserted into the corresponding slot 2a from one side. The leg part 4a of the coil segment 4 protrudes from the other side of the slot 2a.

Figure 3A:
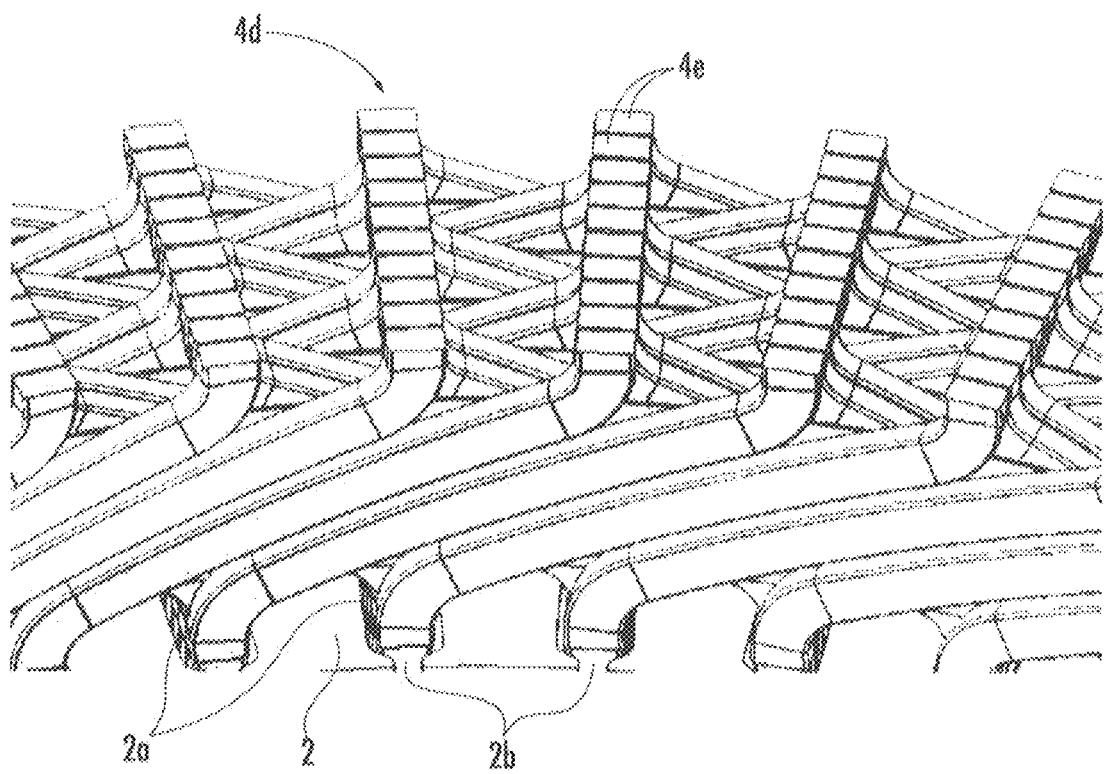
FIG. 3A is a perspective view illustrating a protruding portion of a U phase coil, a V phase coil, and a W phase coil of the coil segment.

As illustrated in FIG. 3A, protruding portions 4d of the leg parts 4a protruding from the other side of the slots 2a are twisted in the circumferential direction of the stator 1 by a twisting device (not illustrated), and tip parts 4e of the corresponding protruding portions 4d are welded by a TIG welding device 10 (refer to FIG. 4) below described in detail. In this manner, the stator 1 including eight coil segments 4 stacked in the radial direction is completed. Herein, a first layer, a second layer, . . . , and an eighth layer are sequentially arranged from the outside to the inside in the radial direction.

Figure 3B:
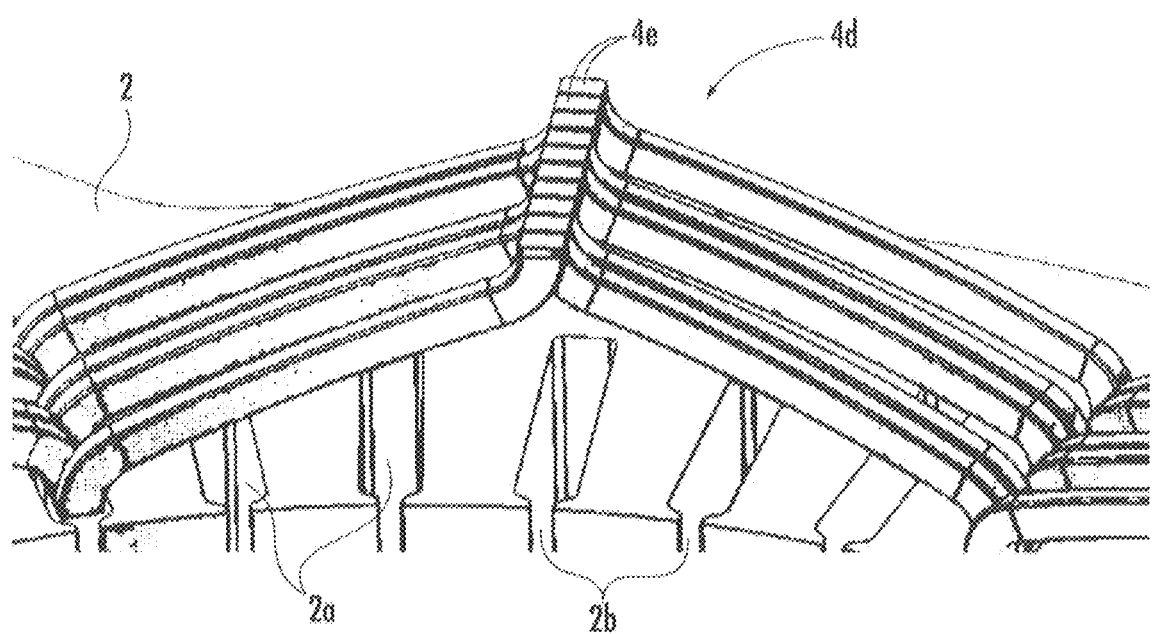
FIG. 3B is a perspective view illustrating the protruding portion of the U phase coil of the coil segment.

The coil 3 of this embodiment is a three-phase coil composed of a U-phase, a V-phase, and a W-phase, and in the leg parts 4a of the coil segments 4 inserted in the respective slots 2a, the U-phase, the U-phase, the V-phase, the V-phase, the W-phase, and the W-phase are sequentially arranged in the circumferential direction. In FIG. 3B, only one phase coil (for example, U-phase coil) of the three phases is illustrated.

Now, the TIG welding device 10 that welds the respective tip parts 4e of the two coil segments 4 will be described.

Figure 4:
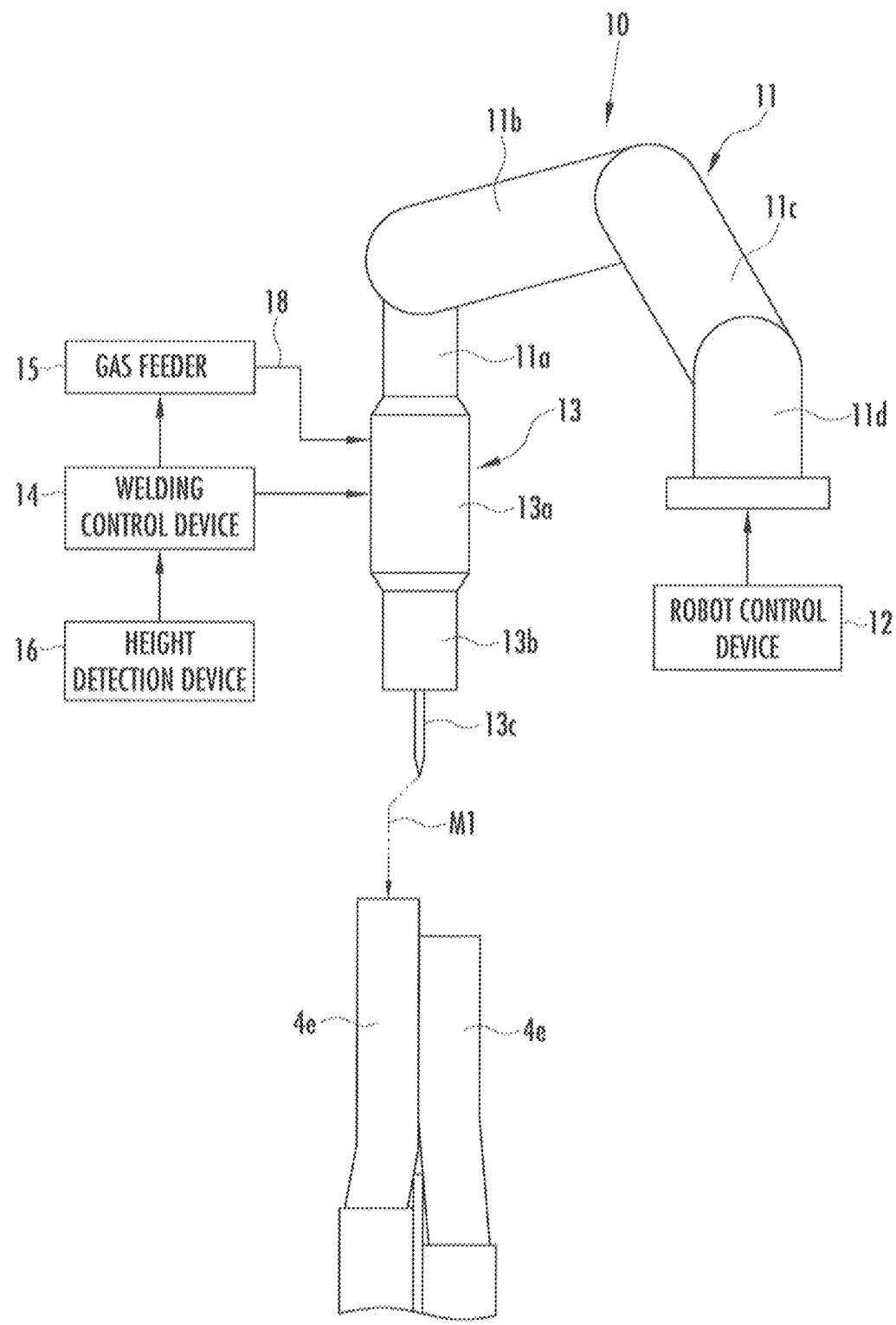
FIG. 4 is a side view illustrating the TIG welding device.

As illustrated in FIG. 4, the TIG welding device 10 includes a welding robot 11, a robot control device 12, and a welding torch 13. Additionally, the TIG welding device 10 includes a welding control device 14, a gas feeder 15, and a height detection device 16. The TIG welding device 10 welds the respective tip parts 4e of the adjacent two coil segments 4.

The welding robot 11 is, for example, a multi-axes articulated welding robot, and is provided with arms 11a to 11d sequentially from a tip. The welding robot 11 is provided with a plurality of motors (not illustrated) that drive the respective arms 11a to 11d, and the driving is controlled by the robot control device 12. The arm 11a located on a tip side of the welding robot 11 is mounted with the welding torch 13.

The robot control device 12 drives the plurality of motors of the welding robot 11, so that the arms 11a to 11d are driven, and a position of the welding torch 13 mounted on the arm 11a is controlled. A mechanism for displacing the welding torch 13 is not limited to the welding robot 11, and can be appropriately changed.

The welding torch 13 includes a torch body part 13a mounted on the arm 11a, a torch nozzle 13b mounted on a tip part of the torch body part 13a, and a torch electrode 13c mounted on a tip part of the torch nozzle 13b and made of tungsten or tungsten alloy.

The gas feeder 15 is connected to the welding torch 13 through a supply pipe 18. Inert gas fed from the gas feeder 15 is fed to the welding torch 13 through the supply pipe 18 to flow in the periphery of the torch electrode 13c. Driving of the gas feeder 15 is controlled by the welding control device 14.

The height detection device 16 detects the heights of the tip parts 4e of the two coil segments 4 by a known detection method using a laser, and transmits detection data to the robot control device 12 and the welding control device 14. The method for detecting the heights of the tip parts 4e can be appropriately changed.

In a case where the respective tip parts 4e of the two coil segments 4 are welded by the TIG welding device 10, the welding robot 11 is driven by the robot control device 12, and the welding torch 13 mounted on the arm 11a on the tip side is set at a reference position having a predetermined height between the two tip parts 4e, as illustrated in FIG. 4. The two tip parts 4e are clamped by a clamper (not illustrated) to be tightly adhered to each other.

After the welding torch 13 is set at the reference position, the height detection device 16 detects the respective heights of the two tip parts 4e, and transmits detection data to the robot control device 12 and the welding control device 14. The welding control device 14 applies a voltage to the torch electrode 13c of the welding torch 13.

Figure 5:
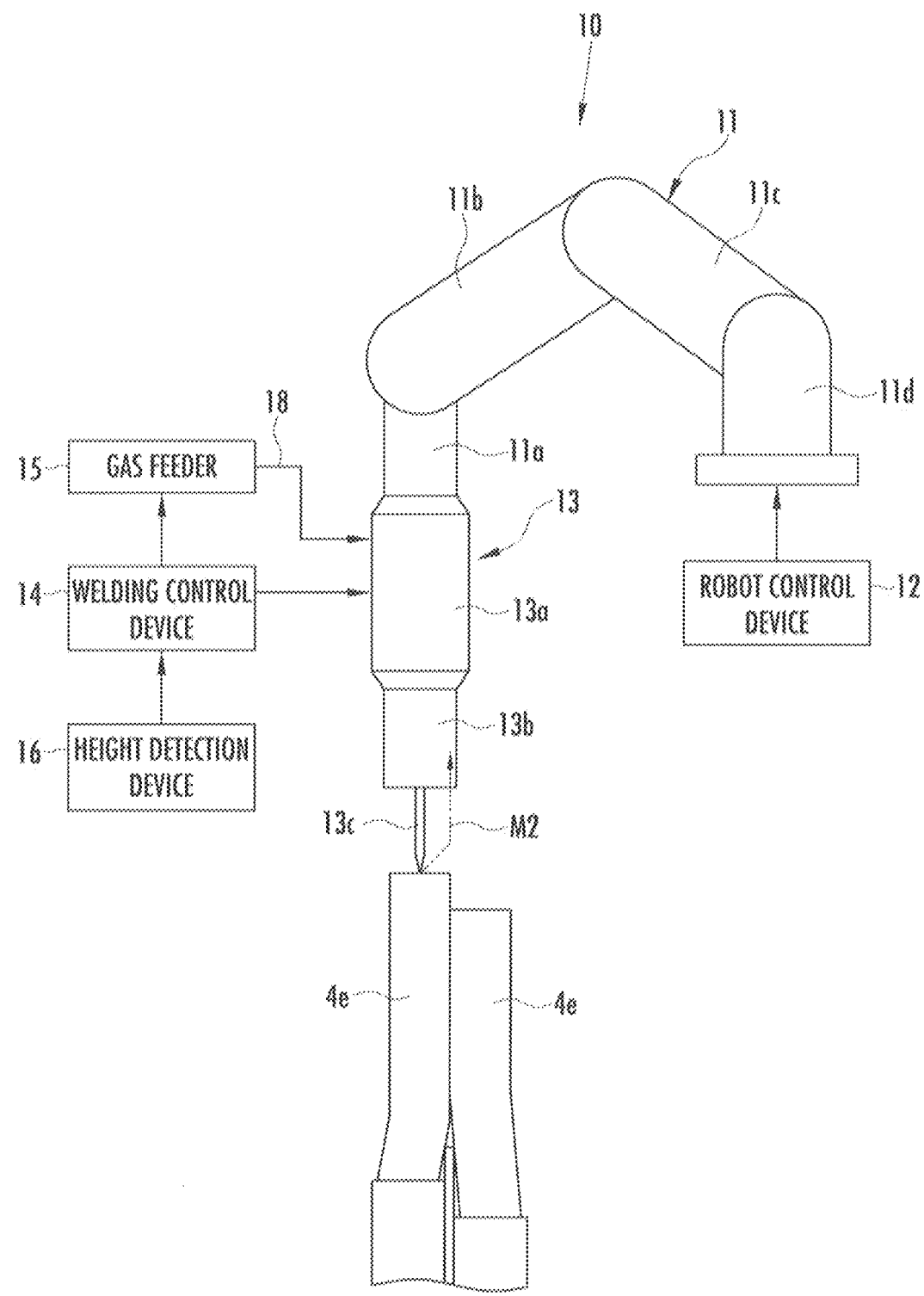
FIG. 5 is a side view illustrating the TIG welding device in a state in which a torch electrode abuts on tip parts of the coil segments.

As illustrated in FIG. 5, the robot control device 12 drives the welding robot 11 such that the torch electrode 13c, to which the voltage is applied, moves along a moving route M1 (refer to FIG. 4), and abuts on a substantially central part of the tip surface of one of the two tip parts 4e, the one having a shorter distance from the tip part of the electrode, namely, having a higher protruding height of protruding from an end surface of stator core (left tip part 4e in FIG. 5) (hereinafter, referred to as a higher one, and the other of the tip parts 4e is referred to as a lower one). The route of the moving route M1 can be appropriately changed. Hereinafter, the left tip parts 4e in FIG. 4 to FIG. 7 is referred to as a higher tip part 4e (one having a shorter distance from the tip surface to the tip of the electrode 13c), and the right tip parts 4e in FIG. 4 to FIG. 7 is referred to as a lower tip part 4e. Herein, the torch electrode 13c preferably abuts on the central part of the higher tip part 4e, but may abut on a position offset from the central part due to a coil state or the like.

When the torch electrode 13c, to which the voltage is applied, abuts on the higher tip part 4e, a current flows, and the voltage drops. By this voltage drop, the welding control device 14 detects that the torch electrode 13c abuts on the higher tip part 4e. Before or after this abutting detection, the welding control device 14 drives the gas feeder 15 to feed inert gas to the welding torch 13 through the supply pipe 18. The fed inert gas flows in the periphery of the torch electrode 13c.

After a predetermined time elapses in a state in which the torch electrode 13c abuts on the higher tip part 4e, the robot control device 12 drives the welding robot 11 such that the torch electrode 13c of the welding torch 13 moves along a moving route M2 to be returned to the reference position. The route of the moving route M2 can be appropriately changed. Additionally, the torch electrode 13c only needs to be moved upward from the state of abutting on the higher tip part 4e, and may be moved just above the higher tip part 4e, for example.

Figure 6:
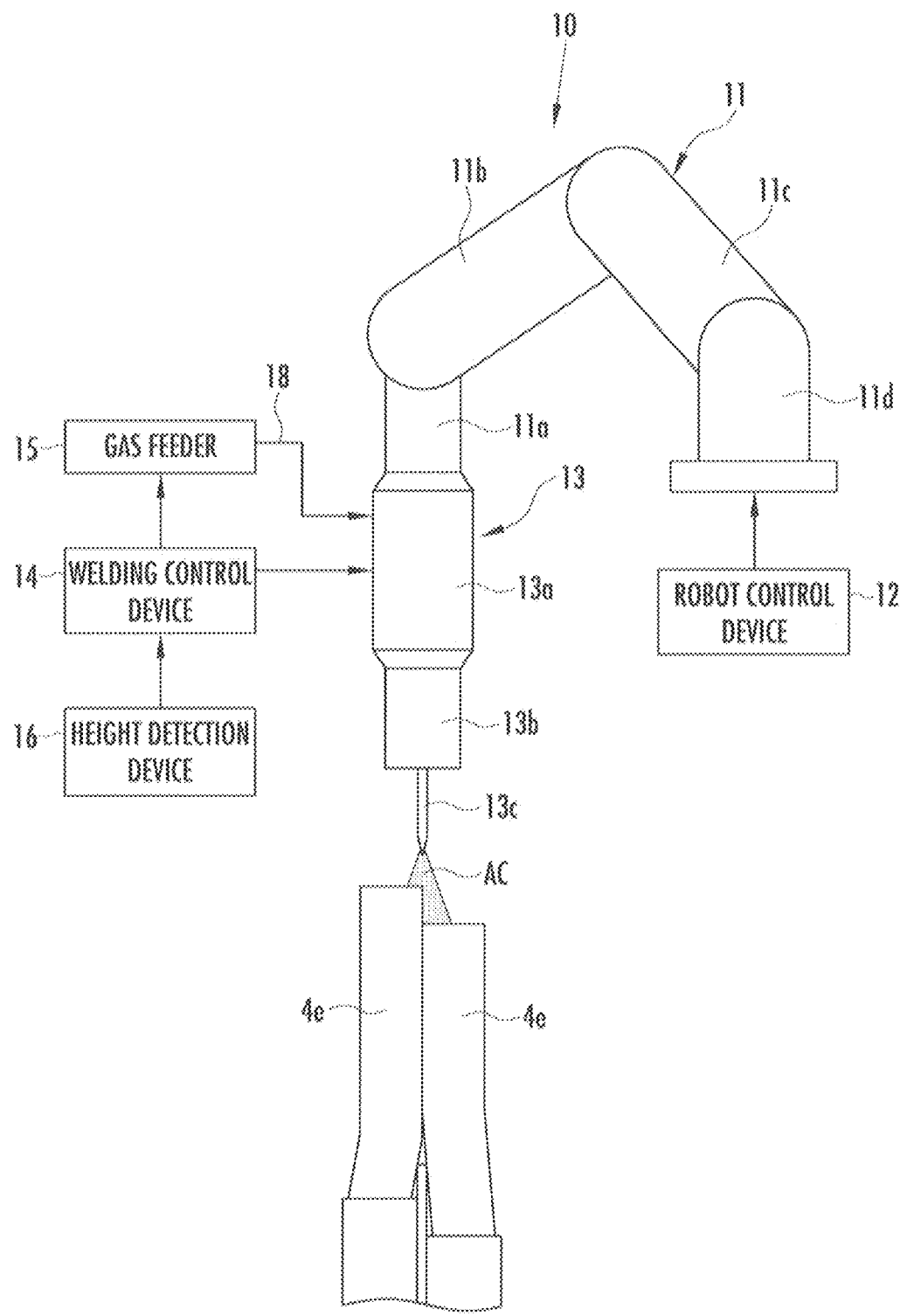
FIG. 6 is a side view illustrating the TIG welding device in a state in which an arc is generated between the tip parts of the two coil segments and the torch electrode.

As illustrated in FIG. 6, when the torch electrode 13c is moved toward the reference position in a state in which the voltage is applied to the torch electrode 13c, and the inert gas flows in the periphery of the torch electrode 13c, an arc AC is generated in a gap between the tip parts 4e and the torch electrode 13c. A range of this arc AC is expanded, as the torch electrode 13c moves upward, and the gap between the tip parts 4e and the torch electrode 13c is increased. By such an arc AC whose range is gradually expanded, the overall two tip parts 4e are melted. FIG. 6 simply illustrates a state in which the two tip parts 4e are not melted.

Figure 7:
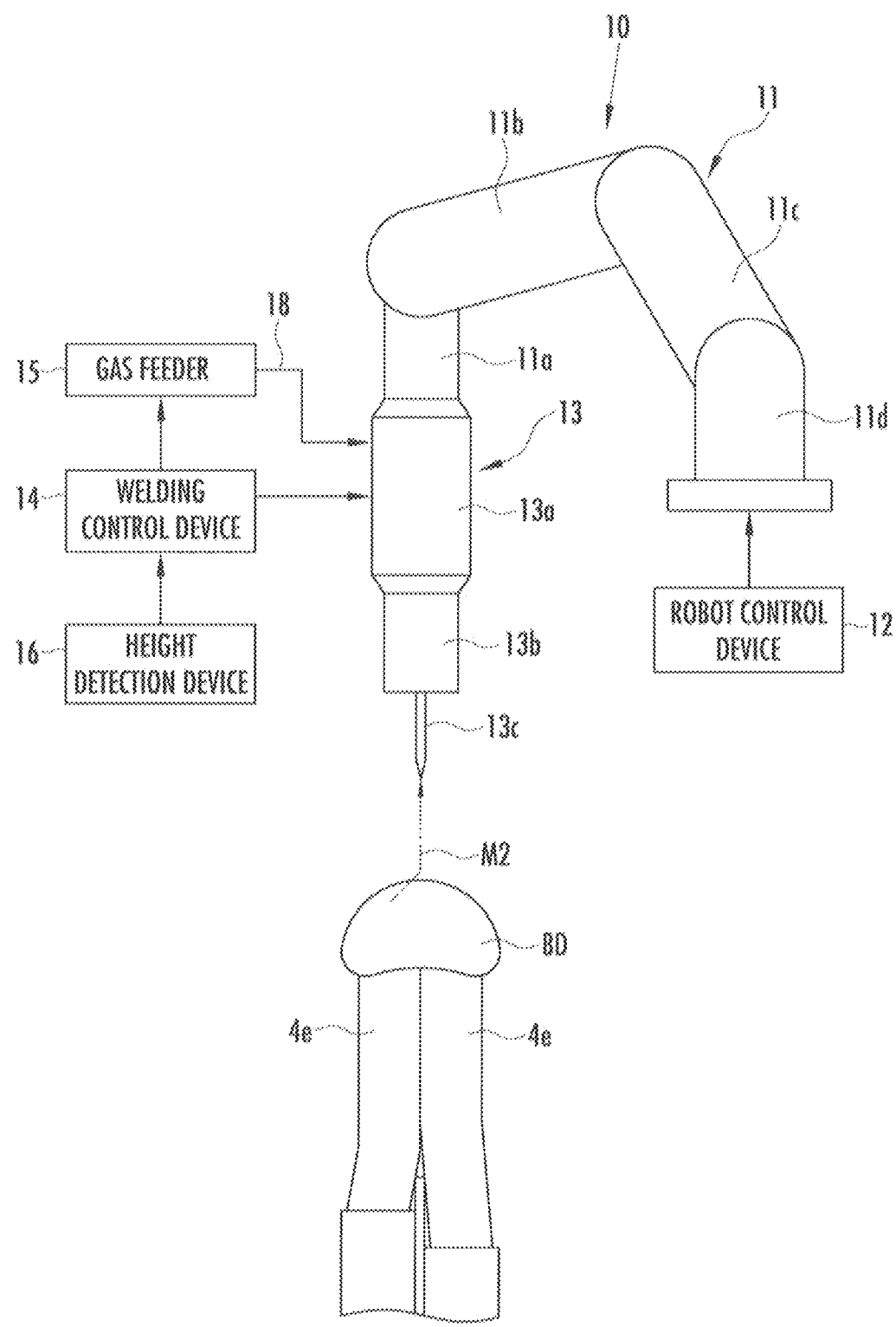
FIG. 7 is a side view illustrating the TIG welding device in a state in which the tip parts of the two coil segments are weld.

As illustrated in FIG. 7, after the torch electrode 13c is returned to the reference position, the welding control device 14 stops voltage application to the torch electrode 13c. Consequently, the arc AC is extinguished, and melted portions of the two tip parts 4e are solidified, and a weld bead BD is formed.

Unlike this embodiment, in a case where the torch electrode 13c is made to abut on the lower tip part 4e, and thereafter moves upward, the lower tip part 4e is melted, but the higher tip part 4e sometimes is in a melting defect state of not being melted. Furthermore, when the torch electrode 13c is move upward, the torch electrode 13c sometimes comes into contact with the higher tip part 4e, and the torch electrode 13c and the higher tip part 4e are welded to each other.

In this embodiment, the torch electrode 13c is made to abut on the substantially central part of the higher tip part 4e, and thereafter moved upward, so that the two tip parts 4e are TIG-welded. Therefore, a problem such as the aforementioned melting defect state, welding of the torch electrode 13c and the higher tip part 4e does not occur, and it is possible to secure welding stability at the time of welding start.

The higher tip part 4e is first melted by the arc AC, and therefore a melted portion of the higher tip part 4e covers the lower tip part 4e. Consequently, it is possible to promote the melting of the lower tip part 4e.

When the torch electrode 13c is made to abut on the substantially central part of the higher tip part 4e, and is moved upward, the torch electrode 13c is moved so as to be located between the two tip parts 4e, and therefore the two tip parts 4e are uniformly melted. Consequently, the weld bead BD can be uniformly and evenly formed on the two tip parts 4e.

In the above embodiment, the two coil segments 4 are welded. However, an object to be welded is not limited to the coil segments, and the present invention can be implemented as long as the object to be welded is a workpiece which is capable of being TIG-welded.

In the above embodiment, the tightly adhered two tip parts 4e are weld. However, the present invention is also applicable, in a case where two workpieces having a gap within a predetermined range are welded.

In the above embodiment, the torch electrode 13c is made to abut on the higher tip part 4e, and thereafter is moved to the reference position between the two tip parts 4e. However, the torch electrode 13c only needs to be moved so as to approach the lower tip part 4e.

REFERENCE SIGNS LIST 1 stator
2 stator core
2a slot
2b slit
3 coil
4 coil segment
4a leg part
4b head part
4d protruding portion
4e tip part
10 TIG welding device
11 welding robot
12 robot control device
13 welding torch
13a torch body part
13b torch nozzle
13c torch electrode
14 welding control device
15 gas feeder
16 height detection device
18 supply pipe

The invention claimed is:

1. A welding method for arc welding a first coil and a second coil by use of an energized electrode, the welding method comprising:
   a first step of detecting one of the first coil and the second coil, the one having a shorter distance from a tip surface to be welded to a tip of the electrode;
   a second step of abutting the tip of the electrode on the tip surface of the one detected in the first step; and
   a third step of generating an arc by separating the tip of the energized electrode from the tip surface of the one detected in the first step, after the second step, and arc welding the first coil and the second coil to join the first coil and the second coil together at a tip of the one detected in the first step.

2. The welding method according to claim 1, wherein
   in the third step, the tip of the energized electrode is displaced so as to be separated from the tip surface of the one detected in the first step, and approach the other coil to generate the arc.

3. The welding method according to claim 2, wherein
   in the second step, the tip of the electrode is made to abut on a central part of the tip surface of the one detected in the first step.

4. The welding method according to claim 1, wherein
   in the second step, the tip of the electrode is made to abut on a central part of the tip surface of the one detected in the first step.

* * * * *